United States Patent
Song et al.

(10) Patent No.: US 12,421,171 B2
(45) Date of Patent: Sep. 23, 2025

(54) METHOD OF PREPARING HIGH-PERFORMANCE GREEN BUILDING MATERIAL BASED ON COMBUSTION FLUE GAS CARBON DIOXIDE MINERALIZATION

(71) Applicant: SOUTHEAST UNIVERSITY, Nanjing (CN)

(72) Inventors: Min Song, Nanjing (CN); Yue Hu, Nanjing (CN); Jiahao Lai, Nanjing (CN); Lei Yu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/871,815

(22) PCT Filed: Nov. 30, 2023

(86) PCT No.: PCT/CN2023/135305
§ 371 (c)(1),
(2) Date: Dec. 5, 2024

(87) PCT Pub. No.: WO2024/174650
PCT Pub. Date: Aug. 29, 2024

(65) Prior Publication Data
US 2025/0171371 A1    May 29, 2025

(30) Foreign Application Priority Data
Feb. 23, 2023  (CN) .......................... 202310152197.X

(51) Int. Cl.
C04B 40/02      (2006.01)
C04B 28/00      (2006.01)
C04B 111/00     (2006.01)

(52) U.S. Cl.
CPC .......... *C04B 40/0231* (2013.01); *C04B 28/00* (2013.01); *C04B 2111/00017* (2013.01); *C04B 2111/00224* (2013.01); *C04B 2201/20* (2013.01)

(58) Field of Classification Search
CPC ..... C04B 28/00; C04B 40/02; C04B 40/0231; C04B 2111/00017; C04B 2111/00224; C04B 2201/20; C04B 18/12; C04B 22/143; C04B 18/08; Y02W 30/91
See application file for complete search history.

(56) References Cited

U.S. PATENT DOCUMENTS

2012/0304894 A1* 12/2012 Abdullah ................ C04B 28/26
                                                         524/2
2018/0179107 A1*  6/2018 Gao ....................... C04B 18/167
2024/0246870 A1*  7/2024 Wang .................... C04B 18/144

FOREIGN PATENT DOCUMENTS

CN      109574610 B  * 11/2020 ........... C04B 28/082
CN      112897972 A    6/2021

(Continued)

OTHER PUBLICATIONS

CN115010419A-Machine Translation (Year: 2022).*

(Continued)

*Primary Examiner* — Yunju Kim
(74) *Attorney, Agent, or Firm* — Bayramoglu Law Offices LLC

(57) ABSTRACT

A method of preparing a high-performance green building material based on combustion flue gas carbon dioxide mineralization, including: calculating a raw material ratio; taking each industrial solid waste material to obtain a solid powder; pouring the solid powder, dihydrate gypsum and gel material into a granulator, mixing uniformly, and then taking a part of the mixture, and then stirring the remaining mixture with deionized water sprayed until spherical kernels are formed, uniformly adding the previously-taken part of mixture to prepare an aggregate; performing hydration reaction (Continued)

on the aggregate; drying the hydrated aggregate to prepare spherical ceramic granules; placing the ceramic granules into a reaction kettle and introducing a combustion flue gas containing $CO_2$ for mineralization reaction, and taking out reacted ceramic granules and putting into drying oven for drying to prepare a cold-bonded lightweight aggregate; supplementing water to the lightweight aggregate to perform hydration reaction and obtain a finished product.

4 Claims, 1 Drawing Sheet

(56) References Cited

FOREIGN PATENT DOCUMENTS

| | | | |
|---|---|---|---|
| CN | 113998982 A | | 2/2022 |
| CN | 114085053 A | * | 2/2022 |
| CN | 114426419 A | | 5/2022 |
| CN | 114591052 A | | 6/2022 |
| CN | 115010419 A | * | 9/2022 |
| CN | 115259712 A | | 11/2022 |
| CN | 115677248 A | | 2/2023 |
| CN | 116177938 A | | 5/2023 |
| JP | 2016130204 A | * | 7/2016 |
| KR | 20130009000 A | | 1/2013 |
| WO | 2022160483 A1 | | 8/2022 |

OTHER PUBLICATIONS

CN114085053A-Machine Translation (Year: 2022).*
JP2016130204A-Machine Translation (Year: 2016).*
CN109574610B-Machine Translation (Year: 2020).*

* cited by examiner

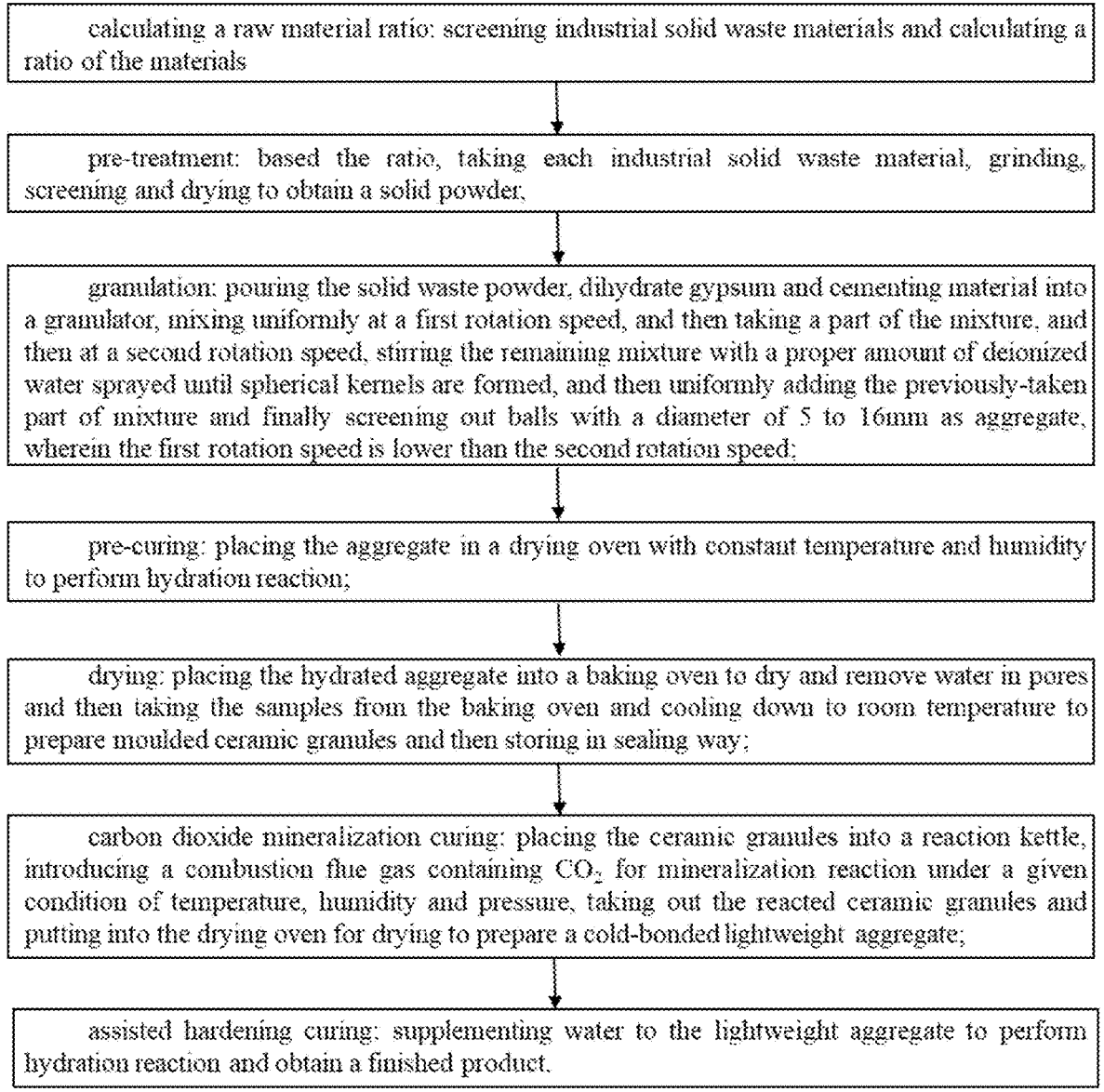

METHOD OF PREPARING HIGH-PERFORMANCE GREEN BUILDING MATERIAL BASED ON COMBUSTION FLUE GAS CARBON DIOXIDE MINERALIZATION

CROSS REFERENCE TO THE RELATED APPLICATIONS

This application is the national phase entry of International Application No. PCT/CN2023/135305, filed on Nov. 30, 2023, which is based upon and claims priority to Chinese Patent Application No. 202310152197.X, filed on Feb. 23, 2023, the entire contents of which are incorporated herein by reference.

TECHNICAL FIELD

The present disclosure relates to the field of carbon dioxide mineralization technologies and in particular to a method of preparing a high-performance green building material based on combustion flue gas carbon dioxide mineralization.

BACKGROUND

Carbon dioxide mineralization storage is one method to realize $CO_2$ capture and utilization, which can carry out near-permanent storage of $CO_2$ (the carbonization reaction is basically irreversible below 600° C.) and thus bear extreme significance in control of greenhouse gas emission and mitigation of global warming. The basic mechanism of carbon dioxide mineralization is that $CO_2$ reacts with oxide/hydroxide of alkaline or alkaline-earth metals (e.g. Ca and Mg and the like) to generate carbonate minerals (e.g. $CaCO_3$ and $MgCO_3$ and the like) with stable physical and chemical properties, so as to realize efficient $CO_2$ storage. The industrial and municipal solid wastes (e.g. fly ash, waste steel slag, desulfurized gypsum, blast furnace slag, carbide slag, red mud and waste incineration ash and the like) usually have the quality of utilization as building material resources and can be used for manufacturing of new-type energy-saving environment-friendly green building materials. Besides, these wastes contain high-concentration calcium and magnesium oxides and hydroxide and therefore have excellent potential of $CO_2$ absorption and mineralization. Further, the carbonization reaction can also improve the comprehensive quality of the solid waste green building materials. Therefore, the coupling of the solid waste green building materials and $CO_2$ mineralization can not only realize efficient storage of $CO_2$ but also prepare green building materials with high added value, "converting wastes into resources", and realizing energy saving and environmental protection. The carbonization curing of the solid waste green building materials is usually carried out at normal temperature. Due to no sintering in the production process, secondary pollution will not be generated for the environment and excessively high temperature of the building materials resulting from high-temperature curing can be avoided so as to ensure the structures and comprehensive quality of the building materials. At present, the influence mechanism of some key curing parameters such as temperature, humidity, $CO_2$ concentration and pressure and the like on the carbonization reaction rate of the building materials has been basically explored, and multiple production devices and curing chambers applicable to $CO_2$ mineralization curing have been developed. Fully-closed and automatic operations can be conducted inside the developed $CO_2$ curing chambers, which solves the difficulty that the workers cannot go in and out under the high-concentration $CO_2$ environment, and provides a path for the industrialization application of the $CO_2$ curing. In the current preparation methods, the solid wastes and base materials can be blended and then directly mineralized, but optimization on the internal structures of the formed aggregates cannot be performed, limiting their absorption and mineralization capability for $CO_2$.

SUMMARY

For the shortcomings of the prior arts, the present disclosure provides a method of preparing a high-performance green building material based on combustion flue gas carbon dioxide mineralization, with the purpose of regulating and optimizing an internal structure of an aggregate formed in a preparation process to improve its absorption and mineralization capability for subsequent $CO_2$ and finally improve the performance of the finished product.

The present disclosure employs the following technical scheme.

A method of preparing a high-performance green building material based on combustion flue gas carbon dioxide mineralization, comprising:
    calculating a raw material ratio: screening industrial solid waste materials and calculating a ratio of the materials;
    pre-treatment: based on the ratio, taking each industrial solid waste material, grinding, screening and drying to obtain a solid powder;
    granulation: pouring the solid waste powder, dihydrate gypsum and gel material into a granulator, mixing uniformly at a first rotation speed, and then taking a part of the mixture, and then at a second rotation speed, stirring the remaining mixture with a proper amount of deionized water sprayed until spherical kernels are formed, and then uniformly adding the previously-taken part of mixture and finally screening out balls with a diameter of 5 to 16 mm as aggregate, wherein the first rotation speed is lower than the second rotation speed;
    pre-curing: placing the aggregate in a drying oven with constant temperature and humidity to perform hydration reaction;
    drying: placing the hydrated aggregate into a baking oven to dry and remove water in pores and then taking the samples from the baking oven and cooling down to room temperature to prepare moulded ceramic granules and then storing in a sealing way;
    carbon dioxide mineralization curing: placing the ceramic granules into a reaction kettle, introducing a combustion flue gas containing $CO_2$ for mineralization reaction under a given condition of temperature, humidity and pressure, taking out the reacted ceramic granules and putting them into the drying oven for drying to prepare a cold-bonded lightweight aggregate;
    assisted hardening curing: supplementing water to the lightweight aggregate to perform hydration reaction and obtain a finished product.

Furthermore, the technical scheme is as below:

Calculating a raw material ratio: based on an association of components contained in the industrial solid waste materials with $CO_2$ reactivity, preliminarily selecting a ratio interval of the components with $CO_2$ high reactivity, setting multiple component ratios in this interval, calculating corresponding $CO_2$ upper limit required for theoretical mineralization, and selecting an optimal component ratio.

The industrial solid waste materials comprise one or more of fly ash, coal gangue, steel slag and iron tailing.

The gel material is cement.

A ratio of the solid waste powder to the gel material is (4.5 to 30):6.

The grinding, screening and drying comprise: grinding and screening to below 60 meshes, and putting into a 65° C. baking oven to dry for 6 h and then taking out and cooling down naturally.

In a granulation process, the first rotation speed is 15 rpm to 20 rpm and the second rotation speed is 80 rpm to 90 rpm.

In a pre-curing process, curing is performed for 24 h with a curing temperature of 23° C. and a curing humidity of 60% RH.

In a drying process, the hydrated and cured aggregate is put into a 120° C. baking oven to dry for 2 h to remove water in pores.

In a carbon dioxide mineralization curing process, the curing condition is: temperature 23° C., humidity 75% RH, pressure 1 to 1.5 MPa, and $CO_2$ volume fraction 15% to 30%.

The present disclosure has the following beneficial effects.

In the present disclosure, a flow of pre-curing-mineralization curing-assisted hardening curing is employed to avoid the damage of the flue gas curing to the aggregate structure, realizing regulation and improvement for the internal structure of the aggregate building material and effectively increasing its $CO_2$ absorption and mineralization capability and further increasing the comprehensive quality of the finished building materials. Furthermore, with waste incineration flue gas, optimization and regulation are performed for $CO_2$ curing, realizing the purpose of "controlling wastes with wastes". The present disclosure specifically further includes the following advantages:

(1) In the present disclosure, with industrial solid waste in place of cement, the shortcomings of the costs and pollution at the time of use of the cement as raw material is solved, and the aggregates with different solid waste ratios require different rotation speeds and premixing conditions due to different physicochemical properties. Therefore, the addition of the remaining mixture and deionized water following nucleation can improve the strength of the lightweight aggregate and lower the density of the lightweight aggregate while ensuring the lightweight aggregate has sufficient pores in curing and the carbon dioxide reaction is complete.

(2) In the present disclosure, before the mineralization curing (carbonization curing), a pre-curing is set up to enable the aggregate to perform hydration reaction with the pure water to produce calcium carbonate and then mineralization curing is carried out, reducing the curing costs. In addition, the reaction is carried out at room temperature, which prevents high-temperature curing from affecting the structure and comprehensive quality of the building materials. Moreover, the pre-curing time is reasonably set to prevent excessively high costs resulting from too long pre-curing time and incomplete hydration reaction and excessively high carbonization reaction costs resulting from too short pre-curing time.

(3) In the present disclosure, the pre-curing makes the inside of the aggregate full of water, increasing the internal kernel strength and compactness; the drying temperature and time following the pre-curing is reasonably set to prevent incomplete removal of the water in the aggregate due to excessively low temperature and excessively short time, and high costs and change of composition of the aggregate due to excessively high temperature and excessively long time. In this way, it is guaranteed that the aggregate has a larger contact area with $CO_2$ and higher carbonization efficiency during mineralization curing.

(4) In the present disclosure, after the mineralization reaction, the assisted hardening curing is set up to further improve the porous structure of the building materials and increase the mechanical strength.

Other features and advantages of the present disclosure will be outlined in the following specification and will partially become apparent from the specification or be known by the practice of the present disclosure.

BRIEF DESCRIPTION OF THE DRAWINGS

FIGURE is a schematic diagram illustrating a flowchart of a method of the present disclosure.

DETAILED DESCRIPTION OF THE EMBODIMENTS

The specific embodiments of the present disclosure will be described below.

With reference to the FIGURE, there is provided a method of preparing a high-performance green building material based on combustion flue gas carbon dioxide mineralization, which includes:

In the method of the present disclosure, a flow of pre-curing-mineralization curing-assisted hardening curing is employed to avoid the damage of the flue gas curing to the aggregate structure, realizing regulation and improvement for the internal structure of the aggregate building material and effectively increasing its $CO_2$ absorption and mineralization capability and further increasing the comprehensive quality of the finished building materials. Furthermore, with waste incineration flue gas, optimization and regulation are performed for $CO_2$ curing, realizing the purpose of "controlling wastes with wastes".

The method of the present disclosure will be further described below by using specific embodiments.

The illustrated embodiments are used only to interpret the present disclosure rather than to limit the scope of the present disclosure. Those embodiments without marked conditions are to be carried out under normal conditions. All reagents or instruments without marked manufacturers are conventional products obtained commercially.

In the following embodiments, the used solid waste materials include coal gangue and fly ash, the gel material is cement, and the combustion flue gas containing $CO_2$ is obtained by simulation in the lab. The basic composition is indicated in Table 1, and the leaching concentrations of heavy metals in three raw materials detected by using the acetic acid solution buffer method are indicated in Table 2.

TABLE 1 main chemical composition in raw materials (wt %)

| Composition | SiO$_2$ | Al$_2$O$_3$ | CaO | SO$_3$ | Fe$_2$O$_3$ | Na$_2$O | TiO$_2$ | MgO | other |
|---|---|---|---|---|---|---|---|---|---|
| Fly ash | 26.53 | 23.79 | 1.28 | 16.08 | 2.73 | 2.26 | 1.30 | 0.182 | 25.848 |
| Coal gangue | 52.82 | 23.73 | 1.6 | 0.322 | 3.71 | 0.450 | 0.807 | 0.728 | 15.833 |
| Cement | 22.54 | 7.83 | 50.81 | 4.67 | 3.48 | 0.393 | 0.454 | 3.60 | 6.223 |

TABLE 2 contents of some heavy metals in raw materials (mg/kg)

| | Fly ash | Coal gangue | environmental standard value * |
|---|---|---|---|
| As (mg/kg) | 318.6 | 46.3 | 600 |
| Cr (mg/kg) | 117 | 141.33 | 6.7 |
| Ni (mg/kg) | 57.33 | 111.33 | 900 |
| Pb (mg/kg) | 3547.67 | 143 | 800 |
| Cu (mg/kg) | 1097.67 | 63.67 | 1800 |
| Cd (mg/kg) | 11.25 | — | 65 |

Embodiment 1

There is provided a method of preparing a high-performance green building material based on combustion flue gas carbon dioxide mineralization, which includes:

calculating a raw material ratio: screening industrial solid waste materials, calculating a ratio of the materials, where the materials include coal gangue, that is, the ratio of the coal gangue to other materials is 1:0;

pre-treatment: grinding the coal gangue and screening to below 60 meshes and then putting into a 65° C. baking oven for drying for 6 h and then taking out and cooling down naturally, so as to obtain a solid waste powder;

granulation: pouring the solid waste powder, dihydrate gypsum and gel material into a granulator, mixing uniformly at the rotation speed of 15 rpm to 20 rpm, taking out a part of the mixture, and then at the rotation speed of 80 rpm to 90 rpm, stirring the remaining mixture with a proper amount of deionized water sprayed until spherical kernels are formed, then uniformly adding the previously-taken part of mixture and finally screening out balls with a diameter of 5 to 16 mm as aggregate;

pre-curing: placing the aggregate in a drying oven with constant temperature and humidity to perform hydration reaction for 24 h at a curing temperature of 23° C. and a curing humidity of 60% RH;

drying: placing the hydrated aggregate into a 120° C. baking oven to dry for 2 h and remove water in pores and then taking the samples from the baking oven and cooling down to room temperature to prepare moulded ceramic granules and then storing in sealing way;

carbon dioxide mineralization curing: placing the ceramic granules into a reaction kettle, introducing a combustion flue gas containing CO$_2$ for mineralization reaction for 72 h under the condition of temperature 23° C., humidity 75% RH, pressure 1 to 1.5 MPa and carbon dioxide volume fraction 15% to 30%, taking out the reacted ceramic granules and putting into the drying oven for drying to prepare a cold-bonded lightweight aggregate;

assisted hardening curing: supplementing water to the lightweight aggregate to perform hydration reaction and obtain a finished product.

Based on the above steps, the ratio of the coal gangue to the cement is adjusted to perform performance test on the finally-obtained finished product, with the performance test results shown in Table 3. The heavy metal test results are shown in Table 4.

TABLE 3 performance test results of lightweight aggregates with different components in the coal gangue/cement system

| coal gangue/cement | Bulk density /kg · m$^3$ | Density level | Apparent density/ kg · m$^3$ | 1 h water absorption rate/% |
|---|---|---|---|---|
| 5:2 | 1055.7 | 1100 | 1650 | 11.88 |
| 2:1 | 1065.3 | 1100 | 1788 | 12.42 |
| 3:2 | 1037.3 | 1100 | 1692 | 10 |
| 4:3 | 1103.3 | 1100 | 2100 | 7.95 |
| 3:4 | 1103.3 | 1200 | 2200 | 8.29 |

TABLE 4 heavy metal results before and after curing in different components in the coal gangue/cement system

| | 5:2 | | 3:2 | | Environmental |
|---|---|---|---|---|---|
| | Uncured | Cured | Uncured | Cured | limit * |
| As | — | — | — | — | 0.1 |
| Cd | — | — | — | — | 0.3 |
| Cr | — | — | — | — | 0.03 |
| Pb | 0.399 | — | 0.412 | — | 0.2 |
| Cu | — | — | — | 0.002 | 1.0 |
| Ni | 0.047 | 0.007 | — | 0.004 | 0.2 |
| Mn | — | — | — | — | 1.0 |
| Zn | — | 0.416 | 0.034 | 0.473 | 1.0 |

Embodiment 2

There is provided a method of preparing a high-performance green building material based on combustion flue gas carbon dioxide mineralization, which includes:

calculating a raw material ratio: screening the industrial solid waste materials as coal gangue and fly ash, and calculating a ratio of the two materials: based on an association relationship diagram of CaO, SiO$_2$ and Al$_2$O$_3$ contained in the industrial solid waste materials with CO$_2$ reactivity, preliminarily selecting a ratio interval of the components with CO$_2$ high reactivity, setting multiple component ratios in this interval, calculating corresponding CO$_2$ upper limit required for theoretical mineralization, and selecting an optimal component ratio; based on the optimal component ratio and the contents of the components in the materials, determining a ratio of the two materials;

pre-treatment: based on the ratio, taking coal gangue and fly ash, grinding and screening to below 60 meshes, and putting into 65° C. baking oven to dry for 6 h and then taking out and cooling down naturally to obtain a solid waste powder;

granulation: pouring the solid waste powder, dihydrate gypsum and gel material into a granulator, mixing uniformly at the rotation speed of 15 rpm to 20 rpm, and then taking a part of the mixture, and then at the rotation speed of 80 rpm to 90 rpm, stirring the remaining mixture with a proper amount of deionized water sprayed until spherical kernels are formed, and then uniformly adding the previously-taken part of mixture and finally screening out balls with a diameter of 5 to 16 mm as aggregate;

pre-curing: placing the aggregate in a drying oven with constant temperature and humidity to perform hydration reaction for 24 h under the condition of a curing temperature 23° C. and a curing humidity 60% RH;

drying: placing the hydrated aggregate into a 120° C. baking oven to dry for 2 h and remove water in pores and then taking the samples from the baking oven and cooling down to room temperature to prepare moulded ceramic granules and then storing in a sealing way;

carbon dioxide mineralization curing: placing the ceramic granules into a reaction kettle, introducing a combustion flue gas containing $CO_2$ for mineralization reaction for 72 h under the condition of temperature 23° C., humidity 75% RH, pressure 1 to 1.5 MPa and carbon dioxide volume fraction 15% to 30%, taking out the reacted ceramic granules and putting into the drying oven for drying to prepare a cold-bonded lightweight aggregate;

assisted hardening curing: supplementing water to the lightweight aggregate to perform hydration reaction and obtain a finished product.

Based on the above steps, the ratio of the fly ash to the coal gangue is adjusted to perform performance test on the finally-obtained finished product. The test results of the bulk densities of the finished product under different additions of fly ash are indicated in Table 5, the test results of the 1 h water absorption rate are indicated in Table 6, the test results of bulk densities are indicated in Table 7, and the leaching contents of the heavy metals are indicated in Table 8.

TABLE 5 test results of bulk densities of the lightweight aggregates in the fly ash/coal gangue/cement system

| Fly ash/coal gangue | 15% cement | | 25% cement | | 40% cement | |
| --- | --- | --- | --- | --- | --- | --- |
| | bulk density/ kg · m³ | Density level | bulk density/ kg · m³ | Density level | bulk density/ kg · m³ | Density level |
| 9:1 | 730 | 800 | 768 | 800 | 783 | 800 |
| 8:2 | 763 | 800 | 775 | 800 | 790 | 800 |
| 7:3 | 790 | 800 | 798 | 800 | 810 | 900 |
| 6:4 | 820 | 900 | 824 | 900 | 840 | 900 |
| 5:5 | 839 | 900 | 843 | 900 | 862.5 | 900 |
| 4:6 | 842 | 900 | 850 | 900 | 889 | 900 |
| 3:7 | 910 | 1000 | 921 | 1000 | 943 | 1000 |
| 2:8 | 931 | 1000 | 933 | 1000 | 962.5 | 1000 |
| 1:9 | 946 | 1000 | 951 | 1000 | 1000 | 1000 |

TABLE 6 test results of 1 h water absorption rate of the lightweight aggregates with different cement contents in the fly ash/coal gangue system

| Fly ash/ coal gangue | Cement 15% (uncured) | Cement 25% (cured 7 d) | Cement 40% (cured 2 d) |
| --- | --- | --- | --- |
| 9:1 | 28.2 | — | — |
| 8:2 | 29.81 | — | — |
| 7:3 | 28.57 | 24.38 | 28.11 |
| 6:4 | 23.62 | 23 | 25.34 |
| 5:5 | 23.14 | 22 | 22.69 |
| 4:6 | 23 | 21.19 | 19.82 |
| 3:7 | 20.29 | 17.58 | 18.52 |
| 2:8 | 19.76 | 14.44 | 15.95 |
| 1:9 | 17.5 | 13.95 | — |

TABLE 7 performance test results of the lightweight aggregates under different curing conditions in the fly ash/coal gangue/cement system

| Fly ash/coal gangue | Bulk density/kg · m³ | | Apparent density/kg · m³ | | 1 h water absorption rate/% | |
| --- | --- | --- | --- | --- | --- | --- |
| | 2 d, RH75% | 5 d, RH100% | 2 d, RH75% | 5 d, RH100% | 2 d, RH75% | 5 d, RH100% |
| 5:5 | 862.5 | 980.83 | 1578.00 | 1806.3 | 22.69 | 2.76 |
| 3:7 | 892.5 | 988.33 | 1800.00 | 1976.19 | 18.52 | 3.18 |
| 1:9 | 962.5 | 1000 | 1900.00 | 2036.34 | 14.43 | 5.46 |

TABLE 8 leaching results of heavy metals under different contents of fly ash and coal gangue

| Fly ash/coal gangue | As | Pb | Cd | Cr | Cu | Ni | Zn | Mn |
| --- | --- | --- | --- | --- | --- | --- | --- | --- |
| 7:3 | 0.1 | — | 0.016 | — | 0.064 | — | — | 0.559 |
| 6:4 | 0.03 | — | 0.008 | — | — | — | — | 0.502 |
| 5:5 | — | — | 0.037 | — | — | — | — | 0.367 |

TABLE 8-continued leaching results of heavy metals under different contents of fly ash and coal gangue

| Fly ash/coal gangue | As | Pb | Cd | Cr | Cu | Ni | Zn | Mn |
|---|---|---|---|---|---|---|---|---|
| 4:6 | 0.072 | — | 0.019 | — | — | — | — | 0.438 |
| 3:7 | — | — | 0.037 | — | — | — | — | 0.363 |
| 2:8 | — | — | 0.025 | — | — | 0.005 | — | 0.359 |
| 8:2 | 0.019 | — | — | — | 0.054 | 0.03 | 0.35 | 0.062 |
| Environmental limit * | 0.1 | 0.3 | 0.03 | 0.2 | 1.0 | 0.2 | 1.0 | 1.0 |

Notes:
— represents undetected in accordance with the standard Control Standard for Pollutants in Cement kilns, unit mg/L From the test results, it can be known that when coal gangue and fly ash are mixed, along with increase of the content of the fly ash, the bulk density of the lightweight aggregate decreases and the water absorption rate increases, which indicates that the addition of the fly ash can increase the hydration curing rate to some extent; and the decrease of the pollution parameters after curing indicates an effect on the environmental pollution. However, in order to ensure the quality of the lightweight aggregate building materials, it is preferred not to add too much fly ash.

The above descriptions are about the preferred embodiments of the present disclosure but the present disclosure is not limited to the specific details of the above embodiments. Various simple variations made to the technical schemes or parameter settings in the present disclosure within the technical idea of the present disclosure shall fall within the scope of protection of the present disclosure.

What is claimed is:

1. A method of preparing a high-performance green building material based on combustion flue gas carbon dioxide mineralization, comprising:
    calculating a raw material ratio: screening industrial solid waste materials and calculating a ratio of the industrial solid waste materials, comprising: based on an association relationship diagram of CaO, $SiO_2$ and $Al_2O_3$ components contained in the industrial solid waste materials with $CO_2$ reactivity, preliminarily selecting a ratio interval of the components with $CO_2$ high reactivity, setting a plurality of component ratios in the ratio interval, calculating a corresponding $CO_2$ upper limit required for theoretical mineralization, and selecting an optimal component ratio;
    pre-treatment: based on the optimal component ratio, taking each industrial solid waste material, grinding, screening, and drying to obtain a solid waste powder, wherein the industrial solid waste materials comprise at least two of a fly ash, a coal gangue, a steel slag, and an iron tailing;
    granulation: pouring the solid waste powder, dihydrate gypsum, and a gel material into a granulator, mixing uniformly at a first rotation speed, and then taking a part of a mixture, and then at a second rotation speed, stirring a remaining mixture with a proper amount of deionized water sprayed until spherical kernels are formed, and then uniformly adding the part of the mixture and finally screening out balls with a diameter of 5 to 16 mm as an aggregate, wherein the first rotation speed is lower than the second rotation speed; a ratio of the solid waste powder to the gel material is (4.5 to 30): 6; the gel material is a cement;
    pre-curing: placing the aggregate in a drying oven with a constant temperature and humidity to perform a first hydration reaction;
    drying: placing the hydrated aggregate into a baking oven to dry and remove water in pores and then taking samples from the baking oven and cooling down to room temperature to prepare moulded ceramic granules and then storing in a sealing way;
    carbon dioxide mineralization curing: placing the moulded ceramic granules into a reaction kettle, introducing a combustion flue gas containing $CO_2$ for a mineralization reaction under a given condition of temperature, humidity, and pressure, taking out reacted ceramic granules and putting into the drying oven for drying to prepare a cold-bonded lightweight aggregate;
    assisted hardening curing: supplementing water to the cold-bonded lightweight aggregate to perform a second hydration reaction and obtain a finished product, wherein the grinding, screening, and drying comprise: grinding and screening to below 60 meshes, and putting into a 65° C. baking oven to dry for 6 h and then taking out and cooling down naturally and wherein in a granulation process, the first rotation speed is 15 rpm to 20 rpm and the second rotation speed is 80 rpm to 90 rpm.

2. The method of preparing the high-performance green building material based on the combustion flue gas carbon dioxide mineralization of claim 1, wherein in a pre-curing process, curing is performed for 24 h with a curing temperature of 23° C. and a curing humidity of 60% RH.

3. The method of preparing the high-performance green building material based on the combustion flue gas carbon dioxide mineralization of claim 1, wherein in the drying process, the hydrated and cured aggregate is put into a 120° C. baking oven to dry 2 h to remove the water in the pores.

4. The method of preparing the high-performance green building material based on the combustion flue gas carbon dioxide mineralization of claim 1, wherein in a carbon dioxide mineralization curing process, a curing condition is: temperature 23° C., humidity 75% RH, pressure 1 to 1.5 MPa, and a carbon dioxide volume fraction 15% to 30%.

* * * * *